Feb. 9, 1971  F. V. GUERRERO  3,561,049
CONTINUOUS MULTI-PLATEN PRESS
Filed Oct. 21, 1968
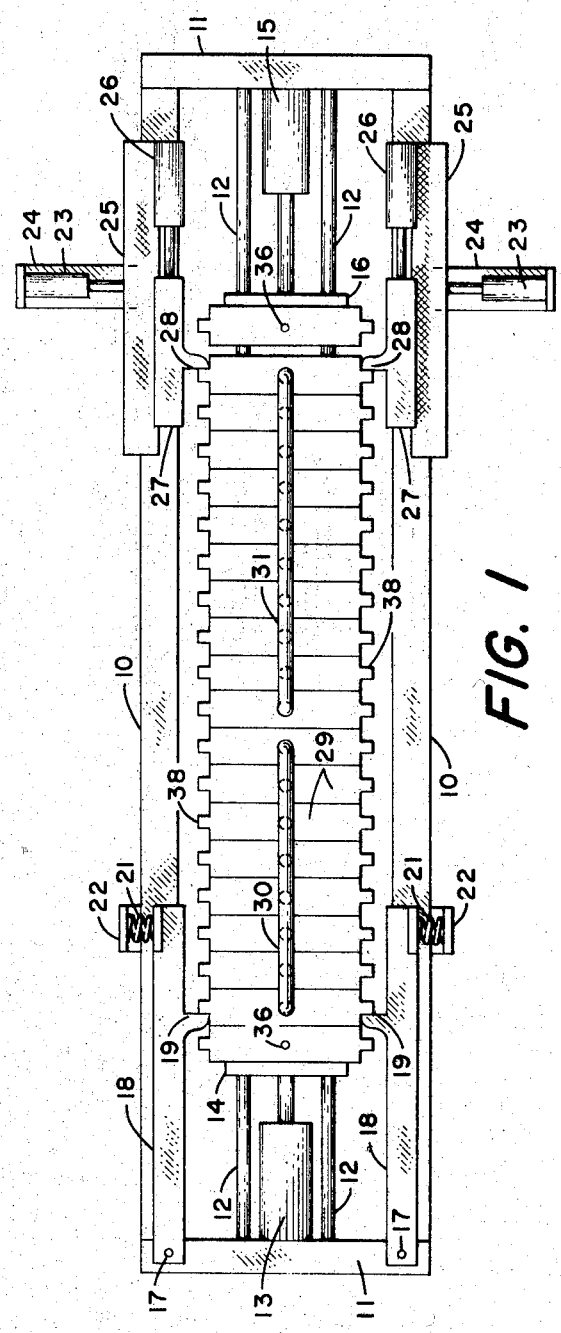
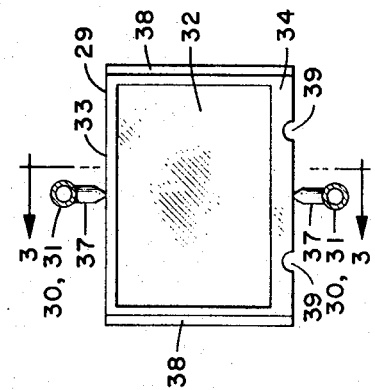
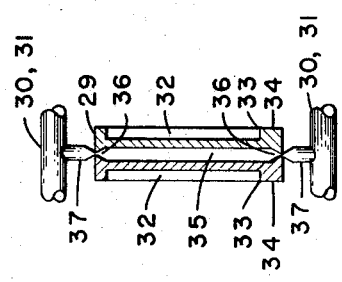
INVENTOR.
FERNANDO V. GUERRERO
BY
*William A. Nickerson*
ATTORNEY United States Patent Office  3,561,049
Patented Feb. 9, 1971

3,561,049
CONTINUOUS MULTI-PLATEN PRESS
Fernando V. Guerrero, Chagrin Falls, Ohio, assignor to Continental Oil Company, Ponca City, Okla., a corporation of Delaware
Filed Oct. 21, 1968, Ser. No. 769,098
Int. Cl. B30b 5/00, 15/34
U.S. Cl. 18—6                                                5 Claims

ABSTRACT OF THE DISCLOSURE

Continuous platen-type press wherein a plurality of mold platens are incrementally moved through a loading, heating, cooling and unloading sequence by e.g. hydraulic cylinders; the device is useful for molding a foamed plastic product.

---

This invention relates to a device for continuous molding with a plurality of platens.

Molding in a plurality of platens has been practiced for some time. However, platen molding operations normally comprise a cycle wherein the entire press is loaded, cycled through the necessary heating and cooling steps, and then unloaded as a batch. Although multi-platen presses are desirable for various molding operations, such as for molding of large objects of thermosetting plastic or of foamed thermoplastic, a batch operation is generally disadvantageous in requiring large amounts of floor space, irregular useage of operator time, etc.

It is accordingly and object of this invention to provide means for continuously cycling mold platens through the necessary molding steps.

Other aspects, objects, and the several advantages of the invention will become apparent upon study of this disclosure, the appended claims, and the drawing, in which:

FIG. 1 is a top view of a press suitable for practice of this invention;

FIG. 2 is a vertical elevation of a platen and manifolds useful in the practice of the invention; and FIG. 3 is a section taken on FIG. 2.

Referring now to the drawing, and to FIG. 1 in particular, the press frame comprises a pair of side members 10 and a pair of end members 11. Traversing the length of the frame at a lower region are a pair of guide rails 12. Fixed at one end of the frame is a feeding cylinder 13 with its associated cross-head 14. Fixed at the other end of the frame is an unloading cylinder 15 with its associated cross-head 16. Pivotally mounted at points 17 near the feed end of the frame are a pair of bars 18 with their associated dogs 19. Dogs 19 are urged inwardly of the frame by a pair of compression springs 21 pushing against bars 18 from a pair of brackets 22 mounted on the frame. Near the unloading end of the frame, a pair of side-engaging cylinders 23 are mounted to the frame on brackets 24; these cylinders are operatively connected to a pair of platforms 25. Platforms 25 each have mounted thereon a platen release cylinder 26 connected to a bar 27 slideably mounted on the platform, which bar carries a dog 28. In use, a plurality of mold platens 29 are supported on rails 12. A heating fluid manifold 30 is supported above the platens near the feed end of the press so as to be moveable up and down, as by a cylinder not shown, into and away from engagement with several of the platens; a similar manifold is provided beneath these same platens. A cooling fluid manifold 31 is supported above the platens near the unloading end of the press so as to be moveable up and down, as by a cylinder not shown, into and away from engagement with other platens; a similar manifold is provided beneath these same platens.

Referring now to FIGS. 2 and 3, each platen 29 has on both of its faces a mold cavity 32 of the desired configuration, surrounded by a retaining rim 33 having a planar face 34. A hollow chamber 35 having upper and lower openings 36 can be provided between the mold cavities 32. Chamber 35 communicates with upper and lower manifolds 30 and 31 by way of openings 36 in the platen and nozzles 37 on the manifolds. Protrusions 38 on the sides of each platen allow for engagement by dogs 19 and 28, and notches 39 serve to guide each platen on rails 12.

Operation of the press will now be described. Assume the press to be in the condition shown in FIG. 1. A suitable plastic compound has previously been charged into each pair of cavities 32 between adjacent platens. Upper and lower heating fluid manifolds 30, and upper and lower cooling fluid manifolds 31 have all their nozzles 37 pressed into engagement with the various openings 36 in the platens. Heating fluid is passing by way of upper manifold 30 through chambers 35 to lower manifold 30, and cooling fluid is similarly passing through other platens by way of manifolds 31. The platen 29 adjacent cross-head 14 has just been placed in the press and loaded with plastic compound by way of an opening not shown. The platen 29 adjacent cross-head 16 can now be lifted from the press, and its finished plastic object removed from the mold; this platen is then taken to the feed end of the press for the next cycle. All manifolds 30 and 31 are now retracted from engagement with platens 29. Feed cylinder 13 is extended, and platen release cylinders 26 are simultaneously retracted, causing all platens 29 to slide to the right on rails 12. When they have moved the distance of one platen thickness, the protrusions 38 on the platen adjacent cross-head 14 are engaged by the ratchet action of dogs 19. All manifolds 30 and 31 are then re-engaged with the platens, and the fluid flow therethrough resumed. Meanwhile, cylinder 15 is extended so that its cross-head 16 encounters the same platen as is held by dogs 28, maintaining the pressure on the platen molds. Cylinders 23 can now be retracted, moving platforms 25 and dogs 28 out of engagement with protrusions 38 on the last platen. Cylinders 26 and then cylinders 23 are now extended, resulting in dogs 28 engaging the protrusions of the next platen. Retracting cylinder 15 completes the cycle.

As can be seen, the press of this invention accomplishes a molding operation by charging a platen to the press at its feed end, and then incrementally moving this platen through a series of heating steps, determined by the length of manifolds 30, a series of cooling steps, determined by the length of manifolds 31, and an unloading step; the platen can then be returned to the feed end. Although the invention has been described as using retractable manifolds for effecting heating and cooling of the platens, it will be obvious that these can be replaced by jackets mounted on the press frame and sized to encompass the appropriate number of platens; in this embodiment, the periphery and internal heat exchange passages of each platen are exposed to heat exchange fluid contained within the chamber. Although the length of the press can be oriented vertically, it is preferably horizontal for ease of access. In another preferred embodiment of this invention, dogs 19 and 28 operate on the top and bottom of the platens, rather than on the sides, as shown. In this embodiment, the heat exchange manifolds communicate with chamber openings 36 at the sides of the platens, but near their tops. Chamber 35 can be provided with a vertical baffle at the center of its width extending from the top to near the bottom thereof. This modification allows a liquid heat exchange medium to be retained in the chamber while nozzles 37 are retracted.

The various cylinders which effect actuation of the press have been described as hydraulic, although it is obvious that other power sources for causing linear motion will be effective. It will also be obvious that the various steps required for a cycle, such as advancing and retracting the cylinders, can be accomplished responsive to a cycle timer, such as a plurality of cammed switches on a timer shaft, each switch actuating a solenoid valve which in turn controls flow of hydraulic fluid to a cylinder.

The cycle to which the press is subjected will of course depend on the type of plastic being molded. For example, a plastic which requires 10 minutes heating and 20 minutes cooling at the temperature of the heat exchange media available will, on a 30-platen press, require one platen being charged and one being unloaded per minute.

While particular embodiments of the invention have been described, it will be understood, of course, that the invention is not limited thereto, since many modifications may be made; and it is, therefore, contemplated to cover by the appended claims any such modification as falls within the true spirit and scope of the invention.

What I claim is:

1. A molding device for subjecting a plurality of platen molds sequentially to heating, cooling and unloading which comprises:
   (a) elongated frame means having a first and a second end,
   (b) platen mold means comprising a pair of substantially parallel planar faces, at least one of said faces containing a concave mold cavity,
   (c) engaging means near said first end of said frame means for restraining said mold means from movement away from said second end of said frame means,
   (d) release means near said second end of said frame means moveable between a first position yieldably restraining said mold means from movement away from said first end of said frame means and a second position permitting movement of said mold means away from said first end of said frame means,
   (e) feeding means near said first end of said frame means for advancing said mold means from said first end toward said second end, and
   (f) unloading means near said second end of said frame means moveable between a first position restraining said mold means from movement away from said first end of said frame means and a second position permitting movement of said mold means away from said first end of said frame means.

2. The device of claim 1 further provided with guide rail means extending substantially the length of said frame means, and means on said mold means for slideably engaging said guide rail means.

3. The device of claim 1 further provided with heating means for supplying heated fluid to a plurality of said mold means adjacent said first end of said frame means, and cooling means for supplying cool fluid to a plurality of said mold means adjacent said second end of said frame means.

4. The device of claim 3 wherein said release means, said feeding means, and said unloading means comprise hydraulic cylinder means, and said engaging means comprise spring-biased ratchet dog means.

5. The device of claim 4 wherein said heating means and said cooling means each comprise moveable manifold means, and wherein said mold means are provided with fluid passage means between said faces.

References Cited
UNITED STATES PATENTS

| | | |
|---|---|---|
| 131,626 | 9/1872 | Noyes et al. |
| 1,469,252 | 10/1923 | Damrow. |
| 1,674,387 | 6/1928 | Campbell. |
| 1,677,200 | 7/1928 | Oakley. |
| 3,078,506 | 2/1963 | Coughey. |
| 3,161,912 | 12/1964 | Wiles et al. |

J. HOWARD FLINT, JR., Primary Examiner

U.S. Cl. X.R.

18—16